United States Patent
Reyes

[11] Patent Number: 6,010,411
[45] Date of Patent: *Jan. 4, 2000

[54] DENSIFIED LOADED FILMS IN COMPOSITE GOLF CLUB HEADS

[75] Inventor: Herbert Reyes, Laguna Niguel, Calif.

[73] Assignee: Callaway Golf Company, Carlsbad, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/958,723

[22] Filed: Oct. 23, 1997

[51] Int. Cl.⁷ ...................................................... A63B 53/04
[52] U.S. Cl. .......................... 473/345; 473/347; 473/348; 473/349
[58] Field of Search ..................... 473/324, 335, 473/345, 347, 348, 349

[56] References Cited

U.S. PATENT DOCUMENTS

| | | |
|---|---|---|
| 1,658,581 | 2/1928 | Tobia . |
| 4,496,153 | 1/1985 | Kochevar . |
| 4,502,687 | 3/1985 | Kochevar . |
| 4,667,963 | 5/1987 | Yoneyama . |
| 4,778,722 | 10/1988 | Yamamura et al. . |
| 4,793,616 | 12/1988 | Fernandez . |
| 4,874,171 | 10/1989 | Ezaki et al. . |
| 5,009,425 | 4/1991 | Okumoto et al. . |
| 5,190,290 | 3/1993 | Take . |
| 5,228,694 | 7/1993 | Okumoto ................................ 473/348 |
| 5,242,168 | 9/1993 | Aizawa .................... 473/332 |
| 5,262,118 | 11/1993 | Fukushima et al. . |
| 5,318,296 | 6/1994 | Adams et al. . |
| 5,350,556 | 9/1994 | Abe ........................ 264/428 |
| 5,377,986 | 1/1995 | Viollaz et al. . |
| 5,429,365 | 7/1995 | McKeighton . |
| 5,485,998 | 1/1996 | Kobayashi ................................ 473/345 |
| 5,489,098 | 2/1996 | Gojny et al. . |
| 5,533,728 | 7/1996 | Pehoski ...................................... 473/252 |
| 5,547,427 | 8/1996 | Rigal et al. . |
| 5,593,356 | 1/1997 | Takeda ..................................... 473/335 |
| 5,672,120 | 9/1997 | Ramirez . |
| 5,674,133 | 10/1997 | Chang . |
| 5,779,560 | 7/1998 | Buck ....................................... 473/342 |

FOREIGN PATENT DOCUMENTS

2 292 332   4/1994   United Kingdom .

*Primary Examiner*—Sebastiano Passaniti
*Assistant Examiner*—Stephen L. Blau
*Attorney, Agent, or Firm*—Lyon & Lyon; Michael A. Catania

[57] ABSTRACT

The present invention is directed to improved heads for golf clubs, including iron, wood and putter type golf club heads, and to methods of manufacturing such golf club heads. One or more layers of a loaded film are used to define in part the overall weight, center of gravity, and inertial characteristics of the golf club head, without significantly affecting the structural characteristics of the golf club head. A set of plies of pre-preg composite fiber sheet and one or more layers of loaded film are applied in a predetermined manner to a forming mold to make a preform. The preform is removed from the forming mold. One or more additional layers of densified loaded film may be applied to the preform, and the preform may be placed in a curing mold. In the case of wood type golf club heads, a bladder may be introduced into a hollow core of the preform. The bladder may be inflated, and the mold may be heated for a predetermined period of time. Alternatively, a dry reinforcement preform may be made on the forming mold from a set of plies of composite fiber and loaded film. Prior to heating the mold, resin is injected into the mold, providing a binding material for the composite fiber and loaded film comprising the preform.

15 Claims, 5 Drawing Sheets

DENSIFIED LOADED FILMS IN COMPOSITE GOLF CLUB HEADS

FIELD OF THE INVENTION

The present invention relates generally to golf club heads and, more particularly, to golf club heads manufactured from composite materials including a densified loaded film that is molded into the golf club heads, and to methods of manufacturing such golf club heads. Golf club heads, in accordance with the present invention, may be used on iron, wood or putter type golf clubs.

BACKGROUND

In recent years, substantial attention has been directed toward the development of golf club heads having desired weight characteristics and, in particular, toward the development of golf club heads having a desired center of gravity location. For example, a designer may want to locate the center of gravity of a golf club head in a predetermined or preferred position relative to the face or "sweet spot" of the golf club head so as to make the golf club head more forgiving upon the occurrence of off-center hits.

Because conventional golf club heads are typically made from metal alloys or other materials having a substantially homogeneous density, the weight characteristics of such golf club heads are typically defined by their overall shape. Thus, to alter the location of the center of gravity of a golf club head, it is often necessary to redesign the shape or configuration of the golf club head. However, this may adversely impact other desired characteristics of the golf club head.

The design process may be further complicated where golf club heads are manufactured using composite materials. Because composite materials are typically less dense than metal and other conventional materials, composite golf club heads generally require additional weighting to achieve desired swing weights for finished golf clubs.

Many solutions have been proposed to adjust and/or increase the weight of composite golf club heads. For example, a weighting agent or material is often introduced into a cavity within a golf club head subsequent to manufacture. In the case of wood type golf club heads, the cavity may be enclosed by the face, sides, sole and crown of the golf club head. However, it is not uncommon for cavities also to be formed, for example, in the sole, heel or toe regions of iron or putter type golf club heads. Because of limited access to the cavities, however, such weighting materials may not be placed as precisely as desired and may not provide the ability to adjust the weight of the golf club heads, or the location of the center of gravity of the golf club heads, very precisely. Furthermore, such materials may dry and separate from the walls of the golf club heads during use, adversely affecting the weight of the golf club heads and possibly creating a distracting sound or feel when the golf clubs are swung.

Alternatively, a composite golf club head may be provided with a metal sole plate or, in the case of wood type golf club heads, a solid or foam core. However, the use of metal sole plates may add undesirable steps in the process of making the golf club heads, and the use of solid or foam core materials has been shown generally to be ineffective for adjusting the location of the center of gravity and moments of inertia of golf club heads. The reason for this is that solid or foam core materials generally have a uniform density, making it difficult to adjust the location of the center of gravity or moments of inertia of the golf club head without simultaneously altering the shape or configuration of the golf club head. Additionally, such materials may result in voids within the golf club head.

For a golf club head including composite material, higher density layers of composite fiber may be provided in the wall of the golf club head to increase its weight. However, such changes in the layers of composite material may affect substantially the structural characteristics of the golf club head.

In view of the foregoing, there appears to be a substantial need for improved methods of manufacturing composite golf club heads and, in particular, for methods that allow for more effective adjustment of the weight characteristics of golf club heads without substantially affecting the structural characteristics of the golf club heads.

There also appears to be a need for improved composite golf club heads manufactured in accordance with such methods.

SUMMARY OF THE INVENTION

The present invention is directed to methods of manufacturing composite golf club heads, wherein the overall weight, center of gravity, and moments of inertia of the golf club heads may be adjusted or defined without simultaneously altering to a significant degree the structural characteristics of the golf club heads. The invention is also directed to golf club heads manufactured in accordance with such methods.

Turning first to the structure of golf club heads in accordance with the present invention, in one innovative aspect such golf club heads preferably comprise a plurality of plies of pre-preg composite sheet and one or more layers of a loaded film. Pre-preg composite sheets are manufactured by pulling strands of fiber, preferably carbon or glass fiber, through a resin film and allowing the resin to partially cure or "stage," thereby forming a malleable sheet. The loaded film preferably comprises a thin, staged resin film that has a densifier or weighting agent (preferably copper, iron or tungsten powder) evenly distributed therein.

In accordance with the present invention, the type, dimensions, location, and orientation of the plies of pre-preg composite sheet within the golf golf club head may be used to define the structural characteristics of the golf club head, while the dimensions and location of one or more plies of loaded film may be used to define and/or adjust the overall weight, the center of gravity, and the moments of inertia of the golf club head. For example, in the case of iron and wood type golf club heads, it may be desirable to provide one or more layers of loaded film in a sole region of the golf club head in an effort to lower the center of gravity of the golf club head. Similarly, in the case of putter type golf club heads, it may be desirable to provide layers of loaded film in heel and toe regions, respectively, of the golf club head to improve the performance of the golf club head upon the occurrence of "off-center" hits.

In view of the foregoing, it will be understood by those skilled in the art that the present invention may be used to modify or enhance the performance characteristics of virtually any golf club head incorporating composite materials. It also will be understood that, while the present invention is particularly useful in, and applicable to, the design and manufacture of iron, wood and putter type composite golf club heads, the present invention also may be applied to the design and manufacture of hybrid or bi-material golf club heads which incorporate composite materials.

The following steps are preferably followed to manufacture a golf club head in accordance with the present invention. The dimensions and relative orientation of the plies of pre-preg composite sheet and loaded film are determined, and a set of plies to be used in the golf club head is prepared. A forming mold having a desired shape for the golf club head is selected, and the plies of pre-preg and loaded film are applied to the forming mold in a predetermined manner to create a preform. A male or female forming mold may be utilized, although female molds are presently preferred.

Preferably, one or more layers of loaded film having a selected shape and mass may be applied first to desired locations on the forming mold. The set of plies of pre-preg may then be applied over the loaded film and forming mold in a predetermined manner to complete the preform. Thus, the loaded film may be positioned at one or more predetermined locations on the inside surface of the preform being formed. Alternatively, one or more layers of loaded film may be applied to the outside surface of the preform after the plies of pre-preg are applied to the mold. In another alternative, one or more plies of pre-preg may be applied to the mold before the loaded film is applied; the plies of loaded film may be applied to the plies of pre-preg; and additional plies of pre-preg may then be applied to the loaded film and pre-preg covered mold. In such an embodiment, the loaded film is disposed between the plies of pre-preg and, thus, embedded within the walls of the preform.

Because wood type golf club heads preferably comprise a substantially enclosed body having a hollow core, it may be necessary to make the preform of such golf club heads in two or more separate pieces or sections, which upon assembly may be cured to form a finished golf club head, as is well known to those skilled in the art. In such an embodiment, the preform preferably includes a cradle section comprising the sole and sides of the golf club head, and a crown section comprising a top cover and face of the golf club head and including a shaft opening or hosel for receiving a golf club shaft. The crown and cradle sections are preferably made on separate forming molds. Alternatively, the preform may include a cradle section including the sides and crown of the golf club head, and a separate sole plate section for the sole of the golf club head. The face may be included in the cradle section or provided as a separate component.

After the preform is completed, the forming mold may be removed from the preform in a manner well known in the art. If desired, additional layers of loaded film may be applied to the preform after the forming mold has been removed therefrom. For example, one or more layers of loaded film may be added to the exterior of the preform in an area defining the sole plate of the golf club head for abrasion resistance and/or weighting purposes.

Because the preforms of wood type golf club heads are often formed in two or more pieces or sections, the loaded film may be added to the respective pieces of such preforms before the preforms are assembled. In addition, after the respective pieces of the preforms are formed into a single component, i.e., an assembled preform, it may be desirable to apply one or more additional plies of pre-preg composite fiber to the exterior surface of the assembled preforms to enhance the integrity of any joint areas within the preforms and to promote uniformity of the outside surfaces of the golf club heads.

Generally, for wood type golf club heads a preform will include a hollow core and have a passage that extends from an area external of the preform into the hollow core. In one presently preferred embodiment, the passage may comprise a shaft opening or hosel in the golf club head for receiving a golf club shaft. Alternatively, the passage may provide a location for a shaft receiving tube to be fixed within the golf club head. In such an embodiment, the shaft receiving tube is preferably preformed from pre-cured composite materials, such as plies of pre-preg, or from other lightweight materials, such as titanium alloys. In addition, the shaft receiving tube is preferably tapered and extends from the crown of the golf club head through the sole, thereby providing a locating device for accurately positioning the preform during curing.

Once assembled, the preform may be placed in a curing mold, having an inner wall defining a desired shape for the golf club head.

In the case of wood type golf club heads, a latex bladder may be introduced into the hollow core, preferably through a passage in a wall of the preform, such as the sole wall. Alternatively, a hole may be provided within the shaft receiving tube for passage of the bladder. If the golf club head is provided without a shaft receiving tube insert, the bladder may also be introduced through the shaft opening or hosel. Once, the bladder has been positioned within the preform, a source of pressurized gas may be attached to the bladder, and the bladder may be inflated within the hollow core. The bladder thereby forces the plies of pre-preg and loaded film against the inner wall of the curing mold.

Once the preform has been properly situated in the curing mold and, in the case of wood type golf club heads, the bladder has been inflated to the desired pressure, the mold may be heated at a predetermined temperature for a selected period of time, i.e., a time sufficient to allow proper curing of the resin comprising the plies of pre-preg and the loaded film. Thereafter, the bladder (if present) may be removed from the core of the golf club head, and the golf club head may be removed from the mold.

Those skilled in the art will appreciate that numerous other methods may be employed to manufacture golf golf club heads in accordance with the present invention, and that the above-described method is but one example of those methods. For example, in an alternative embodiment, the golf club head may be manufactured using a dry reinforcement preform and using a resin transfer molding process.

In such an embodiment, a set of plies of composite fiber without resin, for example, plies comprising a continuous fiber braid or mat of composite strands, may be selected, and one or more layers of loaded film may be selected. The layers of loaded film may be applied to predetermined locations on a forming mold, and the plies of continuous fiber braid or mat may be wrapped around the forming mold or applied over the forming mold in a predetermined manner, creating a dry reinforcement preform. A diluted mixture of resin, for example, an ultra-violet resin, may be applied to the preform to stabilize the preform and to enable handling of the preform without substantial distortion. Once the plies are set, the preform may be removed from the forming mold, and one or more additional layers of loaded film may be applied to predetermined locations on the inside (in the case of wood type golf club heads) or outside surfaces of the preform. The preform and loaded film may then be placed in a curing mold. In the case of wood type golf club heads, a bladder may be inserted into the hollow core of the preform, and the bladder may be inflated to a first predetermined pressure. Resin, such as an epoxy or thermoplastic resin, may then be injected into the mold, providing a binding material for the dry reinforcement preform. After the resin permeates the preform, the curing mold may be heated to a predetermined temperature for a selected time to fully cure the resin injected into the mold. Where bladder molding techniques are employed, the bladder may be inflated to a second predetermined pressure prior to the heating process. Once the golf club head has cured, the bladder (if utilized) may be removed from the golf club head, and the golf club head may be removed from the mold.

In view of the foregoing, it is an object of the present invention to provide improved composite golf club heads including, for example, wood, iron and putter type golf club heads, and to provide improved methods of manufacturing the same.

It is also an object of the present invention to provide improved methods for defining the overall weight, moments of inertia, and center of gravity of composite golf club heads.

Other objects and features of the present invention will become apparent from consideration of the following description taken in conjunction with the accompanying drawings.

DETAILED DESCRIPTION OF THE PREFERRED EMBODIMENTS

Figure 1A:
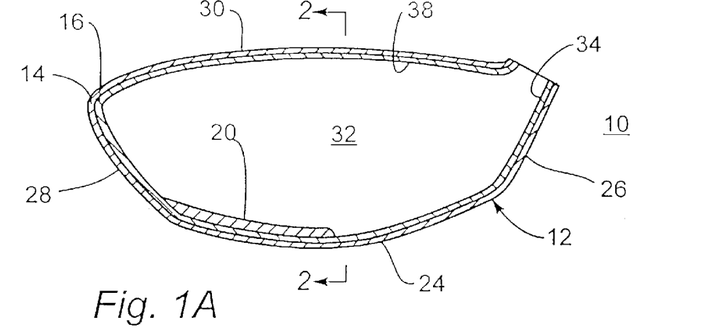
FIG. 1A is a cross-sectional view of a front section of a first wood type golf club head in accordance with one form of the present invention.
Figure 1B:
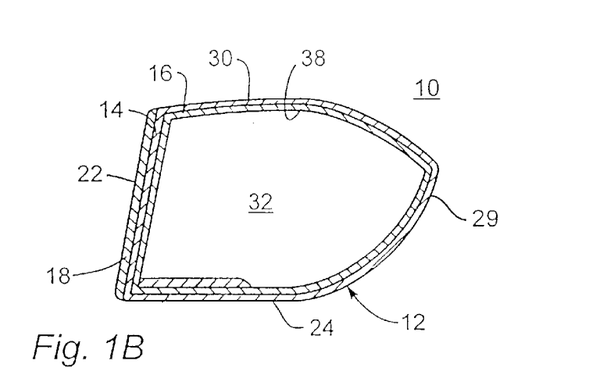
FIG. 1B is a cross-sectional view of the golf club head of FIG. 1A, taken along line 2—2.

Turning now to the drawings, FIGS. 1A and 1B show a preferred embodiment of a golf club head 10 in accordance with the present invention. Those skilled in the art will appreciate that, while the golf club head 10 illustrated in FIGS. 1A and 1B is a wood type golf club head, the invention described herein is equally useful in and applicable to, the design and manufacture of iron and putter type golf club heads. Moreover, it will be appreciated that while presently preferred structures for, and methods of producing, wood type golf club heads, such as the golf club head 10, are described below, the concepts and principles described below will have equal applicability to iron and putter type golf club heads. Accordingly, the design and manufacture of iron and putter type golf club heads are described briefly herein.

The golf club head 10 has a composite body 12, generally including a face wall 22, a sole wall 24, a heel wall 26, a toe wall 28, a back wall 29, and a top wall or crown 30, thereby defining a hollow cavity or core 32 and an inside surface 38 of the golf club head 10. The golf club head 10 includes a passage or shaft opening 34, preferably formed in the crown 30 adjacent the heel wall 26, although alternatively, the golf club head may include a hosel (not shown) instead of the shaft opening 34.

Figure 2A:
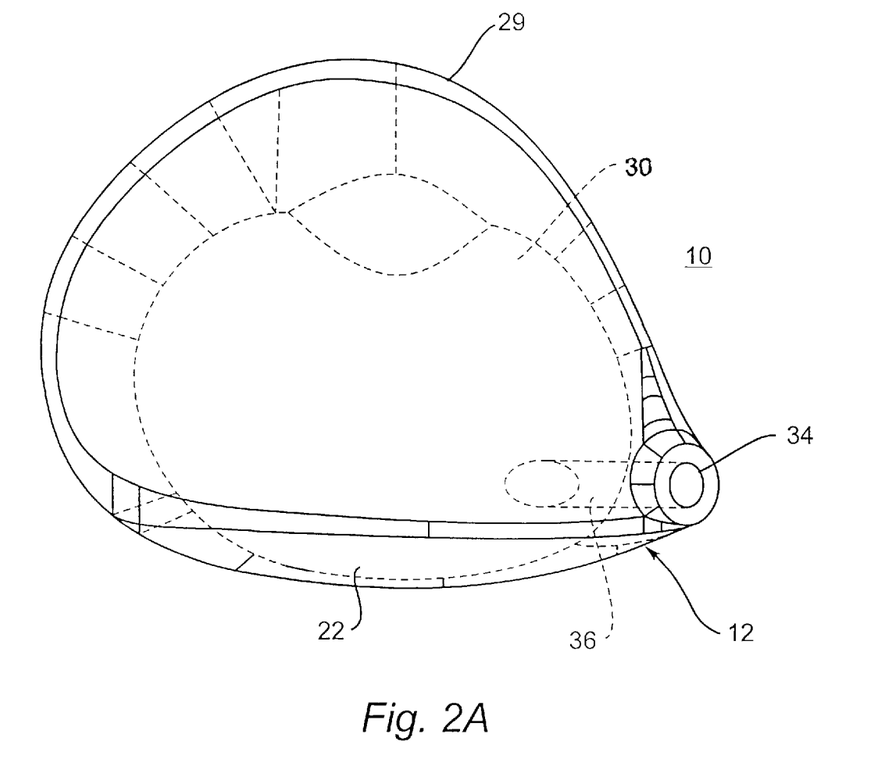
FIG. 2A is a top view of another wood type golf club head in accordance with the present invention.
Figure 2B:
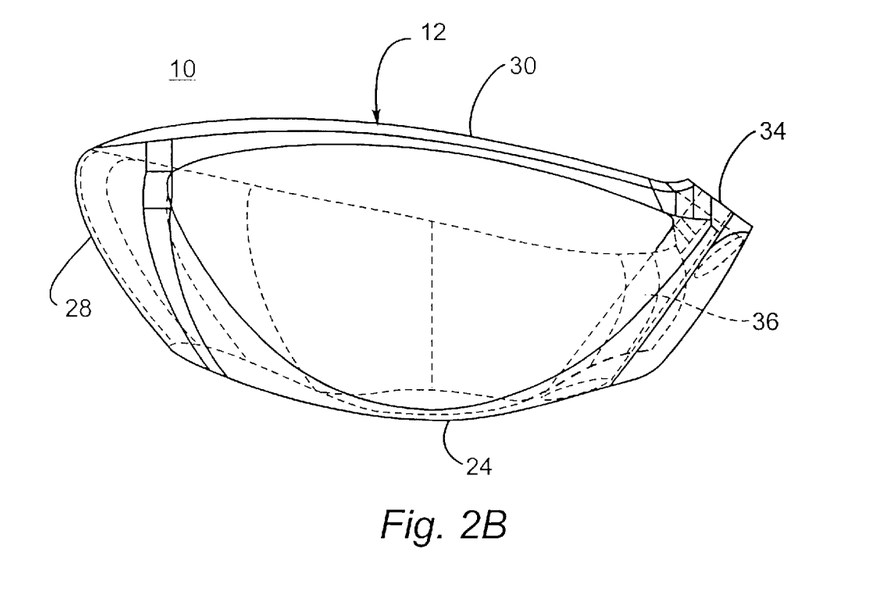
FIG. 2B is a front view of the golf club head illustrated in FIG. 2A.

In addition, as shown in FIGS. 2A and 2B, the golf club head 10 may include a shaft receiving tube 36 that is inserted into the shaft opening 34 or, alternatively, molded within the golf club head 10, to provide additional structural support for a shaft (not shown) attached to the golf club head 10. The shaft receiving tube 36 may be formed from pre-cured composite materials, such as a set of plies of pre-preg, or other lightweight materials, such as a titanium alloy. Alternatively, the shaft receiving tube 36 may comprise a set of plies of composite fiber that may be cured simultaneously with the golf club head 10.

Turning again to FIGS. 1A and 1B, the various walls of the composite body 12 are formed from a set of plies of pre-preg composite sheet, shown generally as 14, 16 and 18, and one or more layers of loaded film, shown as 20. As explained above, pre-preg composite sheets are manufactured by pulling strands of fiber, preferably carbon or glass fiber, through a resin film and allowing the resin to partially cure or "stage". When the resin is partially cured, the resin holds the fibers together such that the fibers form a malleable sheet. Exemplary pre-preg carbon fiber sheets may be obtained from Fiberite Inc. of Greenville, Tex., or Hexcel Inc. of Pleasonton, Calif. Alternatively, the walls of the composite body 12 may comprise a plurality of plies of composite fiber without any resin, each typically comprising a continuous fiber braid or mat, that are used to make a dry reinforcement preform, as will be explained below.

The composite body 12 may include one or more plies of pre-preg that define structurally the various walls of the golf club head. Stated differently, the plies of pre-preg composite sheet are selected and included in the various walls of the golf club head 10 based upon the structural characteristics desired for a finished golf club head. As will be understood by those skilled in the art, the simplified arrangement of plies shown in the figures is merely demonstrative of one configuration that a designer might select. Numerous other configurations may, of course, be utilized depending upon the desired structural characteristics of the golf club head 10.

A layer of densified loaded film 20, or optionally a plurality of layers of loaded film (not shown), may be applied to the inside or outside surface of a wall of the composite body 12, or may be applied within such a wall, as explained below. The loaded film 20 generally comprises a staged resin film that has a densifier or weighting agent, preferably copper, iron, or tungsten powder, evenly distributed therein. The resin may be partially cured such that the loaded film forms a malleable sheet that may be cut to desired dimensions and then applied to one or more predetermined locations within the composite body 12. Exemplary loaded films may be obtained from Cytec of Anaheim, Calif., or Bryte of San Jose, Calif., with copper loaded film being presently preferred.

The loaded film 20 is preferably included in one or more locations on the inside surface 38 of the composite body 12. For example, it may be desired to place loaded film on or around the sole plate 24, thereby providing a golf club head having a center of gravity that is located at a relatively low position within the finished golf club head.

As explained above, those skilled in the art will appreciate that the present invention may be used to modify or enhance the performance characteristics of virtually any golf club head incorporating composite materials. Thus, while the present invention is particularly useful in, and applicable to, the design and manufacture of iron, wood and putter type composite golf club heads, the present invention also may be applied to the design and manufacture of hybrid or bi-material golf club heads which incorporate composite materials.

To manufacture an exemplary wood type golf club head in accordance with the present invention, the following steps are preferably followed.

The dimensions and relative orientation of the plies of pre-preg composite fiber 14–18 and loaded film 20 are determined, and a set of plies 14–20 to be used in the golf club head is prepared.

A forming mold (not shown) having a desired shape for the golf club head is selected. The forming mold may be male or female, although female forming molds are presently preferred. The plies of pre-preg 14–18 and one or more layers of loaded film 20 are applied to the forming mold in a predetermined manner to create a preform. Preferably, one or more layers of loaded film 20 having a selected shape and mass are first applied to predetermined locations on the forming mold. The plies of pre-preg 14–18 are then applied over the forming mold and loaded film 20, thereby resulting in the loaded film 20 being placed at predetermined locations on the inside surface 38 of the composite body 12 of the preform.

Alternatively, one or more plies of pre-preg (not shown) may be applied to the mold before the loaded film is applied. Additional plies of pre-preg may then be wrapped around the mold, resulting in the loaded film being located between the plies of pre-preg, i.e., embedded within the walls of the preform. Finally, one or more plies of loaded film may also be applied to the outside surface of the preform after the plies of pre-preg are applied to the mold.

Because the golf club head 10 comprises a substantially enclosed composite body 12 having a hollow core 32, it may be necessary to make the preform 12 in two or more separate pieces or sections, which may be assembled and cured into a finished golf club head.

Figure 3:
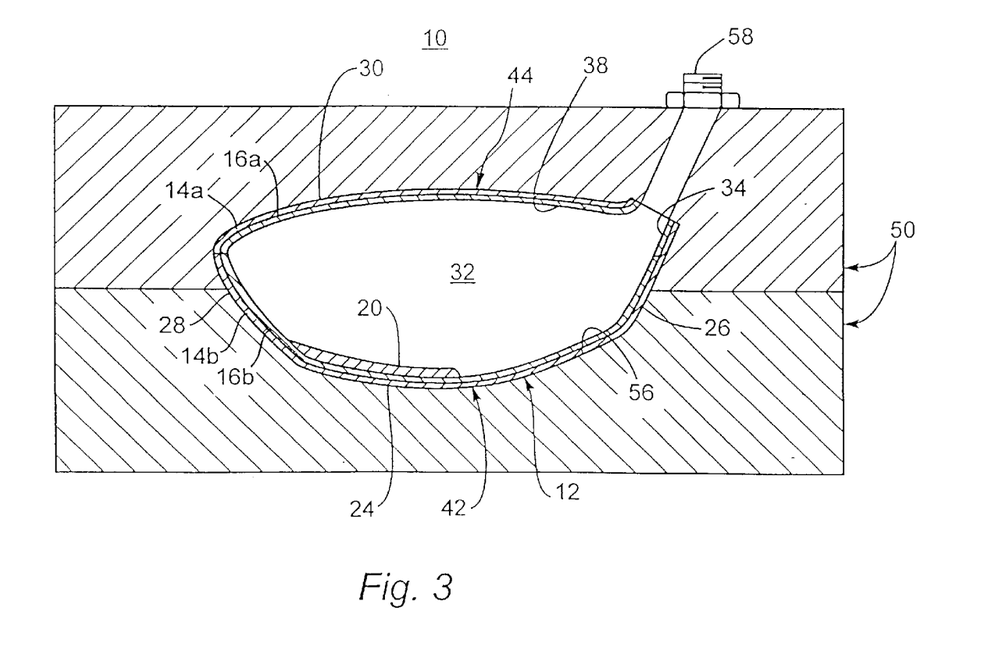
FIG. 3 is a cross-sectional view of a two-section preform of a wood type golf club head in accordance with the present invention, showing the two section preform positioned in a curing mold.

For example, in one preferred embodiment shown in FIG. 3, the preform 12 may comprise two pieces, namely a cradle section 42 and a crown section 44. The cradle section 42 includes the sole wall 24, the back wall 29 (shown in FIG. 1B), the heel 26 and the toe wall 28 of the golf club head, and is made by applying a plurality of plies of pre-preg, shown as 14a and 16a, to a first forming mold (not shown). The crown section 44 comprises the top wall 30, the face wall (shown in FIG. 1B), the shaft opening 34 or hosel (not shown) for receiving a golf club shaft. The crown section 44 is made by applying a plurality of plies, shown as 14b and 16b, to a second forming mold (not shown). Alternatively, the golf club head may be split vertically from the heel to the toe, with each half being formed on a separate mold. In yet another alternative design, the body of the golf club head except for the face and sole may be formed on a first mold, a face plate may be formed on a second mold, and a sole plate may be formed on a third mold.

Once the plies are molded into a preform, the preform may be removed from the forming mold, and one or more additional layers of loaded film may then be applied to the preform. For example, one or more layers of loaded film (not shown) may be added to the sole 24 of the golf club head 10 to provide additional wear resistance and/or weighting.

Because the preform for a wood type golf club head is preferably formed in two or more pieces, the loaded film is generally added to the respective pieces of such a preform before the preform is assembled. Further, the loaded film is preferably applied directly to the forming mold as described above. While the loaded film may be applied to the preform after assembly, such manufacturing techniques are less desirable because access to the hollow core 32 of the preform may be limited.

In addition, after the respective pieces of the preform are assembled, it may be desirable to apply one or more additional plies of pre-preg composite fiber to the assembled preform (not shown) to enhance the integrity of any joint areas within the preform and to enhance uniformity of the outside surface for the golf club head 10.

As explained above and shown in FIGS. 2A and 2B, a shaft receiving tube 36 may be inserted into the shaft opening 34 on the preform 12 to provide additional structural support for a shaft (not shown) attached to the finished golf club head 10. The shaft receiving tube 36 may comprise composite material that has been pre-cured or it may comprise other lightweight materials, such as a titanium alloy. Preferably, the shaft receiving tube 36 extends from the shaft opening 12 through the sole 24 of the preform, thereby providing a locating guide for the preform 12 when it is placed in a curing mold. The shaft receiving tube 36 and shaft opening 34 may include cooperating dovetails (not shown) to attach the shaft receiving tube 36 to the preform 12, or the shaft receiving tube 36 may simply abut the top wall 30 concentric with the shaft opening 34. Alternatively, the shaft receiving tube 36 may comprise a set of plies of pre-preg that may be cured simultaneously with the preform 12.

Turning to FIG. 3, the preform 12 may be placed in a curing mold 50, having an inner wall 56 defining a desired shape for the finished golf club head. An inflatable bladder (not shown), preferably made from latex, silicone, or similar materials, may be introduced into the hollow core 32, preferably through the shaft opening 34 or hosel (not shown) of the golf club head. Alternatively, the preform may include a separate opening that extends into the hollow core 32 for the bladder. Such an opening may be plugged after the golf club head is cured. If a shaft receiving tube 36 (FIGS. 2A and 2B) is attached to the shaft opening 34, the opening for the bladder may be provided through the wall of the shaft receiving tube 36.

Once the bladder has been positioned within the hollow core 32 of the preform 12, a source of pressurized gas (not shown) may be attached by a gas line 58 to the bladder, and the bladder may be inflated within the hollow core 32. The bladder thereby engages the inside surface 38 of the preform 12, forcing the plies of pre-preg 14a, 14b, 16a, 16b, 18a and 18b and loaded film 20 against the inner wall 26 of the curing mold 50. The mold 50 may then be heated at a predetermined temperature for a selected period of time, i.e., a time sufficient to allow proper curing of the resin within the plies of pre-preg 14–18 and loaded film 20. Thereafter, the bladder may be removed from the core 32 of the golf club head 10, and the golf club head 10 may be removed from the mold 50.

Those skilled in the art will appreciate that, depending upon the type of resin used, curing temperatures may range from 250° to 800° F., the requisite curing time may range from a few minutes (for example, in the case of a "quick cure" epoxy or a thermoplastic resin) to 1.5 hours, and the pressure applied via the latex or silicone bladder may range from 100 to 300 psi.

Those skilled in the art will also recognize that numerous other methods may be employed to manufacture golf club heads in accordance with the present invention and that the above-described methods are merely exemplary of those methods. For example, in an alternative embodiment, shown in FIG. 4, a golf club head 10 may be manufactured using a dry reinforcement preform 12 and using a resin transfer molding process. In such an embodiment, a set of plies of composite fiber 14, preferably comprising a braid or fabric of composite strands may be selected. The plies 14 and one or more layers of loaded film 20 may be wrapped around or otherwise applied to the forming mold (not shown) in a predetermined manner, creating a dry reinforcement preform 12. The preform 12 may then be removed from the forming mold, and one or more layers of densified loaded film 20 may be applied to locations on the outside or inside surface of the dry reinforcement preform 12.

Figure 4:
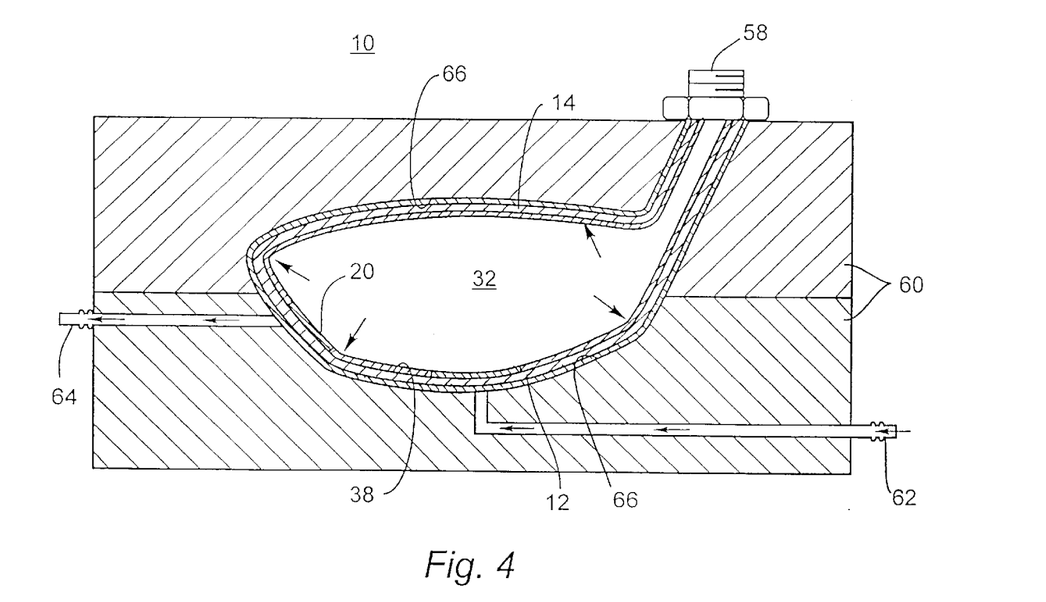
FIG. 4 is a wood type cross-sectional view of a golf club head in accordance with the present invention, showing a dry reinforcement preform of a golf club head being formed in a curing mold by a resin transfer molding process.

Preferably the loaded film 20 is placed on the forming mold prior to the application of the plies of composite fiber 14. The plies of composite fiber 14 may then be placed over the loaded film 20 and the forming mold to produce a shaped preform 12. A diluted mixture of resin and solvent, including, for example, an ultra violet resin, may then be applied to the preform 12. The preform 12 may then be placed under an ultra violet light source for 1–2 minutes to partially cure the resin, thereby stabilizing the preform 12 and allowing it to be handled without substantial distortion. The preform 12 may then be removed from the forming mold with the resin maintaining the orientation of the fibers comprising the preform. It will be understood by those skilled in the art that the preform 12 may be made in two or more pieces, requiring assembly prior to curing.

As described above, the preform 12, including the loaded film 20, may be placed in a curing mold 60, and a latex or silicone bladder 70 may be inserted into the hollow core 32 of the preform 12. Pressurized gas (not shown) from a gas line 58 may then be used to inflate the bladder 70 to a predetermined pressure, preferably about 40–80 psi. Resin (not shown), such as an epoxy or thermoplastic resin, may then be injected into the mold through one or more injection ports 62, between the inner wall 66 of the mold 60 and the bladder 70, providing a binding material for the dry reinforcement preform 12. A vacuum line (not shown) may be connected to a vacuum port 64 to evacuate air from the preform 12, and to allow air and resin to bleed off during the resin process, thus assisting the resin in fully permeating the preform. If necessary, after injection of the resin the bladder 70 may be inflated further, preferably to about 120–200 psi, and the curing mold 60 may be heated, preferably to between about 120 and 350° F., to cure the resin injected into the mold 60. Once cured, the bladder 70 may be removed from the golf club head 10, and the golf club head 10 may be removed from the mold 60.

Once the golf club head 10 is cured, the golf club head 10 may be used to manufacture a finished golf club. A golf club shaft (not shown) may be inserted into the shaft opening 34 and/or shaft receiving tube 36, although the shaft opening 34 (and interior of the shaft receiving tube 36) may require additional machining or boring to provide a desired shaft size, as will be understood by those skilled in the art. Alternatively, the shaft receiving tube 36 (FIGS. 2A and 2B) may be inserted into the shaft opening 34 and attached to the golf club head 10 using conventional methods or adhesives to provide additional structural support for the golf club shaft.

Figure 5A:
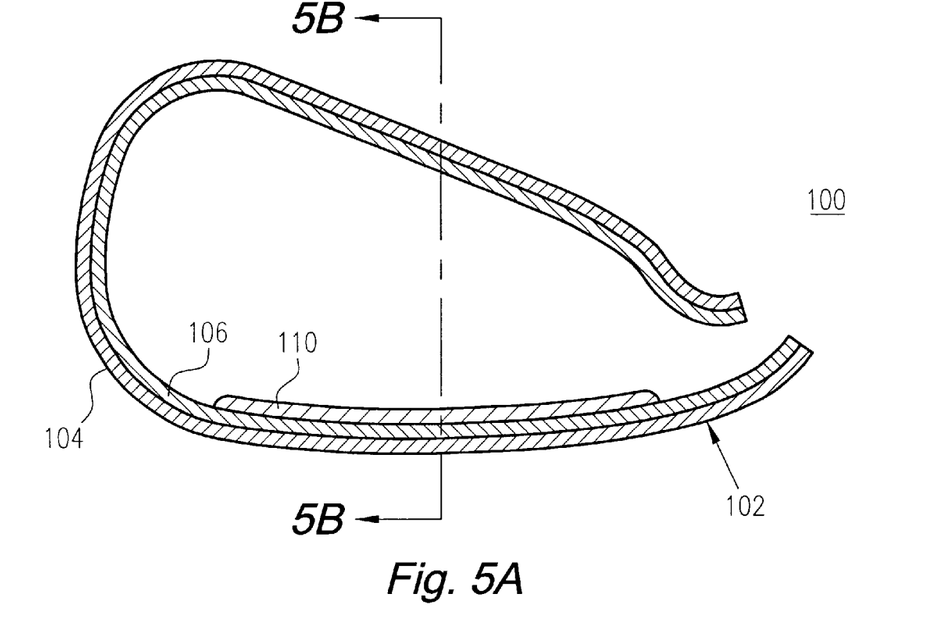
FIG. 5A is a cross-sectional view of a front section of a iron type golf club head in accordance with a form of the present invention.
Figure 5B:
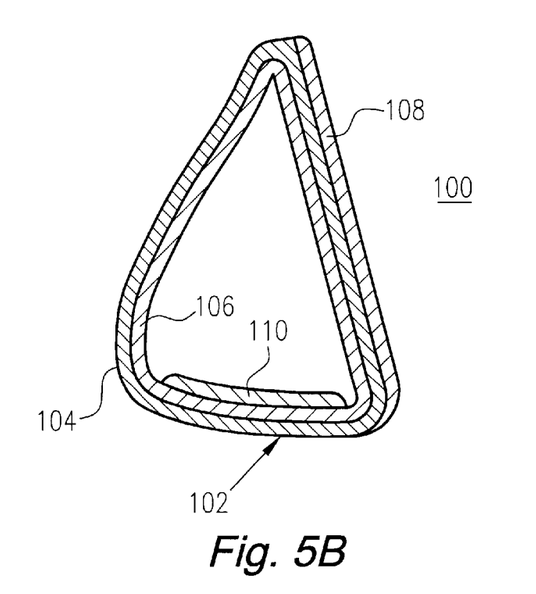
FIG. 5B is a cross-sectional view of the golf club head of FIG. 5A, taken along line 5B—5B.
Figure 6A:
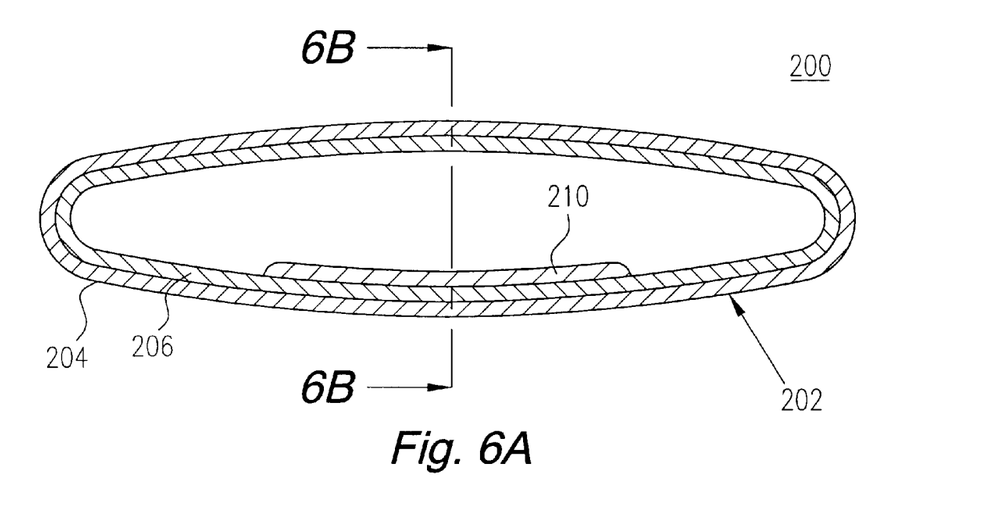
FIG. 6A is a cross-sectional view of a front section of a putter type golf club head in accordance with a form of the present invention.
Figure 6B:
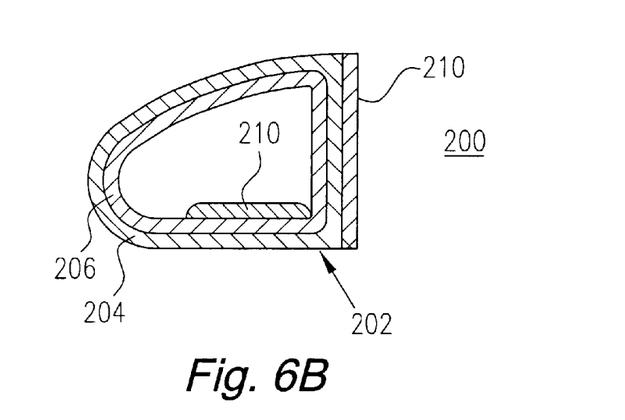
FIG. 6B is a cross-sectional view of the golf club head of FIG. 5A, taken along line 6B—6B.

The concepts and principles described above can be applied to iron and putter type golf club heads. For instance, FIGS. 5A and 5B show a preferred embodiment of an iron type golf club head 100 in accordance with the present invention. The golf club head 100 includes a composite body 102 formed from a set of plies of pre-preg composite sheet, shown generally as 104, 106 and 108, and one or more layers of loaded film, shown as 110. FIGS. 6A and 6B show a preferred embodiment of a putter type golf club head 200 in accordance with the present invention. The golf club head 200 includes a composite body 202 formed from a set of plies of pre-preg composite sheet, shown generally as 204, 206 and 208, and one or more layers of loaded film, shown as 210.

Thus, in accordance with the present invention, the type, dimensions, location, and orientation of the plies of pre-preg composite sheet within the golf club head may be used to define the structural characteristics of the golf club head, while the dimensions and location of one or more plies of loaded film may be used to define and/or adjust the overall weight, the center of gravity, and the inertial characteristics of the golf club head.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A golf club head comprising:
    a composite body comprising a plurality of layers of composite fiber, said composite body having a face for striking a golf ball and a bottom section, said composite body also having a circumference defining a hollow cavity;
    at least one layer of loaded film comprising a resin film with a densifier distributed therein, a bottom surface of said at least one layer of loaded film chemically adhered with said bottom section of said composite body and a top surface of said at least one layer of loaded film in contact with said hollow cavity, said at least one layer of loaded film in contact with less than fifty percent of the circumference of said composite body.

2. The golf club head of claim 1, wherein said plurality of layers of composite fiber comprise a plurality of plies of pre-preg composite sheet.

3. The golf club head of claim 1, wherein said plurality of layers of composite fiber comprise a dry reinforcement preform and a resin within said dry reinforcement preform, said resin being transfer molded into said dry reinforcement preform.

4. The golf club head of claim 1, wherein said composite body comprises a body for an iron type golf club head.

5. The golf club head of claim 1, wherein said composite body comprises a body for a wood type golf club head.

6. The golf club head of claim 1, wherein said composite body comprises a body for a putter type golf club head.

7. A golf club head comprising:
    a body comprising a plurality of layers of composite fiber, and defining a hollow central cavity; and
    at least one layer of loaded film including a resin with a non-fibrous densifier distributed therein, said loaded film having a density exceeding a density of said composite fibers, and a bottom surface of said loaded film chemically adhered with said body and a top surface of said loaded film defining a portion of the hollow cavity;

whereby a set of structural characteristics of said golf club head is substantially defined by said plurality of layers of composite fiber; and whereby an overall weight, center of gravity and moments of inertia of said golf club head are defined at least in part by a mass and location of said at least one layer of loaded film.

8. The golf club head of claim 7, wherein said composite body includes an inside surface defining a hollow core, and wherein said composite body includes a passage extending from an area external of said composite body to said hollow core.

9. The golf club head of claim 7, wherein said plurality of layers of composite fiber comprise a plurality of plies of pre-preg composite sheet.

10. The golf club head of claim 7, wherein said layer of loaded film comprises one of the group of copper, iron or tungsten powder evenly distributed within an epoxy resin.

11. The golf club head of claim 7, wherein said composite body further comprises:

a cradle section comprising a plurality of layers of composite fiber and partially defining said hollow core of said composite body; and a crown section comprising a plurality of layers of composite fiber and being integrally bonded to said cradle section, thereby fully defining said hollow core of said composite body.

12. The golf club head of claim 11, wherein said crown section includes a crown, a face and a shaft opening of said golf club head, and wherein said cradle section includes a sole and side walls of said golf club head.

13. A golf club comprising:

a bi-material body comprising a plurality of layers of composite fiber and at least some metal, said bi-material body defining a hollow cavity; and at least one layer of loaded film comprising a resin film with a non-fibrous densifier distributed therein, a bottom surface of said at least one layer of loaded film chemically adhered with said bi-material body and a top surface of said at least one layer of loaded film defining a portion of the hollow cavity.

14. The golf club head of claim 13, wherein said at least one layer of loaded film is also fixed in a predetermined relationship to said metal.

15. A golf club head comprising:

a composite body comprising a plurality of layers of composite fiber, said composite body having a bottom section, said composite body also having a circumference defining a hollow cavity and an external surface;

at least one layer of loaded film comprising a resin film with a non-fibrous densifier distributed therein, a top surface of said at least one layer of loaded film chemically adhered with said external surface of said bottom section of said composite body.

* * * * *